United States Patent [19]

Omura et al.

[11] Patent Number: 4,720,542
[45] Date of Patent: Jan. 19, 1988

[54] FORMAZAN BLUE REACTIVE DYE

[75] Inventors: Takashi Omura, Ashiya; Yasuo Tezuka, Ibaraki; Masaki Sunami, Toyonaka, all of Japan

[73] Assignee: Sumitomo Chemical Company, Limited, Osaka, Japan

[21] Appl. No.: 822,961

[22] Filed: Jan. 28, 1986

Related U.S. Application Data

[63] Continuation of Ser. No. 157,446, Jun. 9, 1980, abandoned.

[30] Foreign Application Priority Data

Jun. 20, 1979 [JP] Japan .................... 54-78606

[51] Int. Cl.$^4$ .................... C09B 50/00; C09B 62/095; C09B 62/535; D06P 1/38
[52] U.S. Cl. .................... 534/618; 534/598; 534/652
[58] Field of Search .................... 534/618, 617

[56] References Cited

U.S. PATENT DOCUMENTS

| | | | |
|---|---|---|---|
| 2,670,265 | 2/1954 | Heyna et al. | 534/618 X |
| 3,068,219 | 12/1962 | Beffa et al. | 534/618 |
| 3,223,470 | 12/1965 | Boedeker et al. | 534/638 X |
| 3,655,642 | 4/1972 | Meininger et al. | 534/638 X |
| 3,926,942 | 12/1975 | Yelland | 534/618 |
| 3,998,805 | 12/1976 | Koller et al. | 534/641 X |
| 4,024,123 | 7/1919 | Dussy et al. | 534/618 |

FOREIGN PATENT DOCUMENTS

| | | | |
|---|---|---|---|
| 2308857 | 8/1973 | Fed. Rep. of Germany | 534/618 |
| 2364764 | 7/1974 | Fed. Rep. of Germany | 534/618 |
| 2557141 | 7/1976 | Fed. Rep. of Germany | 534/618 |
| 2197946 | 3/1974 | France | 534/618 |
| 410237 | 10/1966 | Switzerland | 534/638 |
| 901434 | 7/1962 | United Kingdom | 534/638 |
| 901437 | 7/1962 | United Kingdom | 260/153 |

Primary Examiner—Floyd D. Higel
Attorney, Agent, or Firm—Stevens, Davis, Miller & Mosher

[57] ABSTRACT

A formazan reactive blue dye represented by a free acid of the formula,

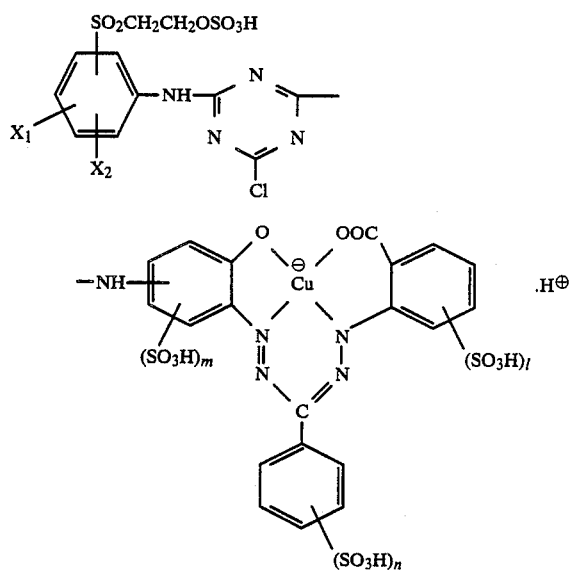

wherein $X_1$ and $X_2$ are each a hydrogen atom, a methyl, methoxy or sulfonic acid group, m and l are each an integer of 0 or 1 and n is an integer of 0 to 2, provided that the sum of m, n and l is 2 or 3. This dye is usable for dyeing cellulose fibers in a brilliant blue color with good fastness, particularly, against chlorine, light and perspiration-light, as well as good white dischargeability.

5 Claims, No Drawings

FORMAZAN BLUE REACTIVE DYE

This application is a continuation of application Ser. No. 157,446, filed June 9, 1980, now abandoned.

The present invention relates to a formazan blue reactive dye usable for dyeing cellulose fiber materials in a brilliant blue color.

It is well known that dyes having a β-sulfatoethylsulfonyl group or so-called vinylsulfone-type reactive dyes are used for dyeing fiber materials. Generally, however, materials dyed with azo blue reactive dyes of this kind are not brilliant in shade, and besides they are so poor in chlorine fastness that they often discolor due to chlorine in city water. By contrast materials dyed with anthraquinone blue reactive dyes having the β-sulfatoethylsulfonyl group have a brilliant blue color, but they are very poor in white dischargeability with reducing agents. Under these circumstances, a formazan copper complex dye of this kind having the following formula (a) is known, as disclosed in British Pat. No. 1,540,565, desired color density, when used for dip dyeing. Accordingly, they are only used for printing. Besides, these dyes produce dyed materials of a poor acid stability. Thus, the dyes of this kind are not always satisfactory in practical use. For example, a monochlorotriazinyl reactive dye of the following formula (b) is disclosed in Published Examined Japanese Patent Application No. 5041/1963,

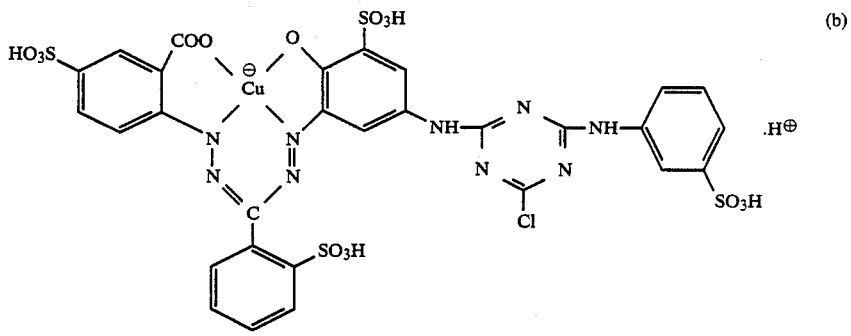

(b)

However, the acid stability of materials dyed with this dye is insufficient (2nd to 3rd grade, as tested by immersing the dyed fabric in 1% acetic acid for 30 minutes and then subjecting it to a 6-hour treatment under the conditions of $37 \pm 2°$ C. and 125 g/cm² by using a perspirometer).

For the reasons described above, the inventors extensively studied to find a blue reactive dye having a particularly superior chlorine fastness, a high acid stability, a good white dischargeability, superior suitability for exhaustion dyeing and a brilliant blue color similar to that of anthraquinone blue reactive dyes. As a result, it was found that a formazan copper complex type reactive dye having both a β-sulfatoethylsulfonyl group and

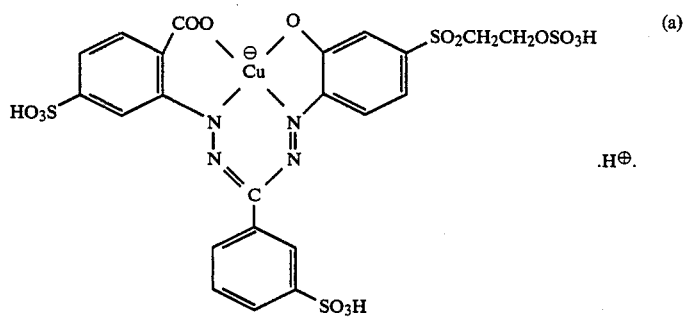

(a)

However, this dye is not satisfactory in color brilliance and exhaustion percentage.

Reactive blue dyes having a monochlorotriazinyl group are also known. Generally, however, these reactive dyes require high dyeing temperature and also lack exhaustion dyeing ability, therefore cannot produce a a monochlorotriazinyl group as reactive groups can produce blue dyed products meeting the above requirements.

The present invention provides a compound represented by a free acid of the formula (I),

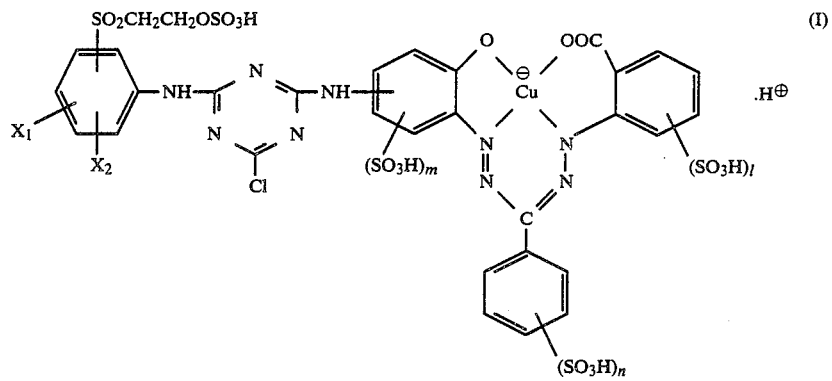

(I)

wherein $X_1$ and $X_2$ are each a hydrogen atom, a methyl, methoxy or sulfonic acid group, m and l are each an integer of 0 or 1 and n is an integer of 0 to 2, provided that the sum of m, n and l is 2 or 3, and a process for producing the compound of the formula (I), which comprises (i) reacting a formazan compound of the formula (II),

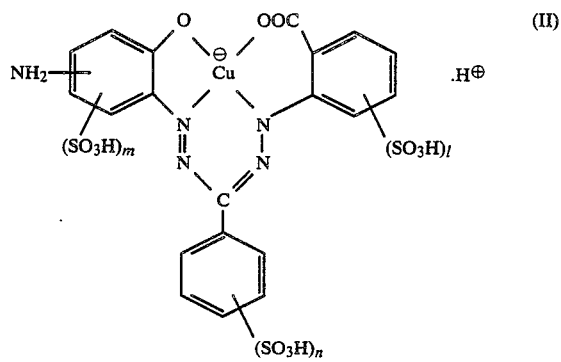

(II)

wherein l, m and n are as defined above, with cyanuric chloride, then reacting the resulting compound of the formula (III),

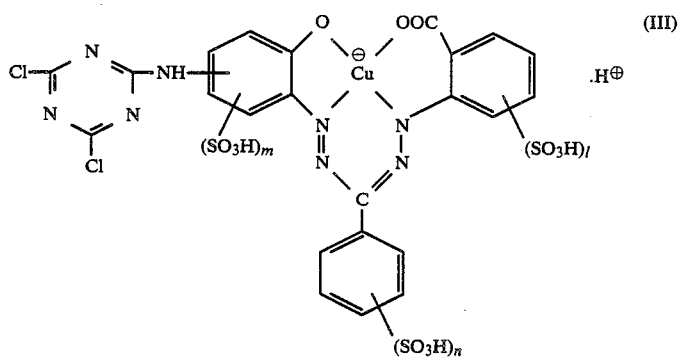

(III)

wherein l, m and n are as defined above, with an aniline compound of the formula (IV),

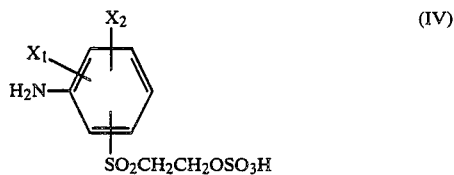

(IV)

wherein $X_1$ and $X_2$ are as defined above, or (ii) reacting the aniline compound of the formula (IV) with cyanuric chloride, and then reacting the resulting compound with the formazan compound of the formula (II), or (iii) reacting the triazinylformazan compound of the formula (III) with a β-hydroxyethylsulfonyl compound of the formula (V),

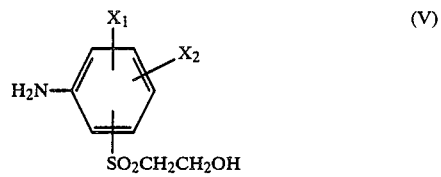

(V)

wherein $X_1$ and $X_2$ are as defined above, and then esterifying the resulting compound in sulfuric acid and/or sulfur trioxide.

The formazan compound of the formula (II) can be produced by a process known per se, for example, a process comprising reacting a phenylhydrazine of the formula (VI),

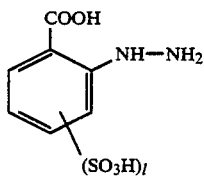

(VI)

wherein l is as defined above, with a benzaldehyde of the formula (VII),

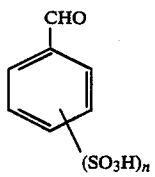

(VII)

wherein n is as defined above, in an aqueous solution; reacting the resulting hydrazone with a diazotized compound of an amine of the formula (VIII),

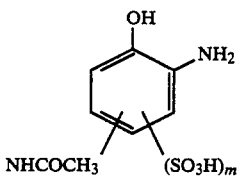

(VIII)

wherein m is as defined above, at a temperature of 0° to 5° C. in the presence of an alkali such as sodium carbonate; adjusting the pH of resulting formazan compound to within the range 5–6 using an acid such as acetic acid, followed by heating at a temperature of 40° to 50° C. together with a copper compound such as copper sulfate; isolating the resulting formazan copper complex by salting-out; and hydrolyzing the acetylamino group of the complex in an aqueous solution of alkali such as sodium hydroxide.

As to the preparation of one novel compound of the formula (I), the following explanation is given.

The aniline compound (IV) usable in the present invention includes, for example, 1-aminobenzene-3- or 4-β-sulfatoethylsulfone, 1-amino-2-methoxybenzene-5-β-sulfatoethylsulfone, 1-amino-4-methoxybenzene-3-β-sulfatoethylsulfone, 1-amino-2-methoxy-5-methylbenzene-4-β-sulfatoethylsulfone and 1-amino-2-sulfobenzene-4-β-sulfatoethylsulfone.

The phenylhydrazine (VI) includes 2-carboxyphenylhydrazine, 2-carboxyphenylhydrazine-4-sulfonic acid and 2-carboxyphenylhydrazine-5-sulfonic acid.

The benzaldehyde (VII) includes, for example, benzaldehyde, 2-, 3- or 4-sulfobenzaldehyde and 2,4-disulfobenzaldehyde.

The amine (VIII) includes, for example, 3- or 4-acetylamino-2-hydroxyaniline, 3-acetylamino-2-hydroxyaniline-5-sulfonic acid and 5-acetylamino-2-hydroxyaniline-3-sulfonic acid.

The first condensation between cyanuric chloride and the formazan compound of the formula (II) or the aniline compound of the formula (IV) can be carried out at a temperature of 0°–30° C. for 1–10 hours under stirring in an aqueous medium containing a surfactant while controlling the pH at 2–8 by using an acid binding agent (e.g. sodium hydroxide, sodium carbonate or sodium hydrogen carbonate). The second condensation between the obtained dichlorotriazinyl compound of the formula (III) and the aniline compound of the formula (IV) or between the dichlorotriazinylanilino compound derived from the aniline compound of the formula (IV) and the formazan compound of the formula (II) can be carried out at an elevated temperature of 10° to 60° C. for 1–10 hours under stirring while controlling the pH at 4–7 by using the same acid-binding agent as described above. In the case of the reaction between the β-hydroxyethylsulfonyl compound of the formula (V) and the triazinylformazan compound of the formula (III), the resulting compound is isolated by salting out, dried, and then esterified an excess amount of an esterification agent such as sulfuric acid and/or sulphur trioxide at 0°–60° C.

The thus obtained formazan blue dye can be used for dyeing cellulose fiber materials in a conventional dyeing method such as exhaustion dyeing, printing and cold batch up dyeing.

Examples of cellulose fiber materials to be dyed in accordance with the present invention, include natural or regenerated cellulosic fibers such as cotton, flax, viscose rayon, viscose staple fiber and the like.

In the exhaustion dyeing, it can be carried out at a relatively low temperature in the presence of an acid-binding agent (e.g. sodium carbonate, trisodium phosphate, sodium hydroxide) using a dyeing bath containing sodium sulfate or sodium chloride.

Further, the dyes of this invention are capable of level dyeing, have a wide range of dyeing temperatures and are minimized in effect by the amount of inorganic salt used and bath ratio, hence have good color reproducibility.

The dyes of the present invention can give a dyed product superior particularly in chlorine fastness (4th grade, ISO method), light fastness (7th grade) and perspiration-light fastness (4–5th grade) to that dyed with conventional azo blue reactive dyes having a β-sulfatoethylsulfonyl group. Particularly, considering that the use of chlorine bleaching agents has recently become popular in washing at home, the dyes of the present invention having a superior chlorine fastness may be said to be of a high value. Further, the present dyes of superior light fastness and perspiration-light fastness are suitable for dyeing outdoor wear such as sports wear. Besides, the present dyes are markedly good in white dischargeability (4th grade) as compared with anthraquinone blue dyes having a similar color, so that they are advantageous to obtain dyeings of high value.

Also, the dyes of the present invention have a high exhaustion and fixing percentage in exhaustion dyeing, so that colors of deep hue can be obtained.

They are also distinguished by their excellent wash-off properties, easy removability of the unfixed dye and very small amount of residual dye in the dye bath, which indicates advantage of the dyes of this invention in respect of waste water treatment, too.

The conventional reactive dyes with mono- or di-chlorotriazinyl groups involved the problem that the textile materials dyed therewith would be affected by acidic gas or other matters in the air and lowered in color fastness with the lapse of time, but the dyes of this invention have eliminated such problems, too. That is, the fabrics dyed with the dyes of this invention show high acid stability (4th to 4–5th grade) (the testing method is as mentioned above). The superior properties of the present dyes are not affected by contamination with a compound having vinylsulfonyl group (—SO$_2$CH=CH$_2$) in place of the β-sulfatoethylsulfonyl group of the present compound (I).

The present invention will be illustrated with reference to the following examples, which are not intended to limit the scope of the present invention. All parts in the examples are by weight.

EXAMPLE 1

2-Carboxyphenylhydrazine-5-sulfonic acid (23.2 parts) and benzaldehyde (11.0 parts) were added to water (100 parts), and the resulting aqueous liquor was stirred at 55° C. overnight to obtain a hydrazone compound. Separately from this, a solution comprising water (50 parts), 3-acetylamino-2-hydroxyaniline-5-sulfonic acid (24.6 parts) and conc. hydrochloric acid (28.2 parts) was cooled to 0° to 10° C., and a solution of sodium nitrite (7.1 parts) in water (13 parts) was added thereto. After stirring the mixture at the same temperature for 1 to 2 hours, an excess of the nitrite was removed to obtain a diazo compound. This diazo liquor and the above hydrazone liquor were mixed and stirred at 0° to 5° C. in the presence of soda ash until the diazo compound was no longer detected. The formazan liquor thus formed was adjusted to a pH of 5 to 6 with acetic acid, and after adding crystalline copper sulfate (26.2 parts), it was stirred at 40° to 50° C. for about 5 hours. Thus, the formazan compound was converted to its copper complex. The complex was isolated by salting-out with sodium chloride and added to a 3% aqueous sodium hydroxide solution which was then kept at 90° C. for about 1 hour to decompose the acetylamino group. After adjusting the pH of the solution between 6 and 7, cyanuric chloride (16.6 parts) was added to the solution which was then stirred at 20° to 25° C. for about 5 hours while being adjusted to a pH of 5 to 6 with a 20% aqueous sodium carbonate solution.

Thereafter, 1-aminobenzene-3-β-sulfatoethylsulfone (25.3 parts) was added to the above reaction solution which was then heated to 40° C. while being adjusted to a pH of 5 to 6 with a 20% aqueous sodium carbonate solution and stirred at the same temperature for 5 hours. Sodium chloride was added to the solution to salt out crystals. The crystals were suction-filtered, washed and dried at 60° C. to obtain 77 parts of the dye (1).

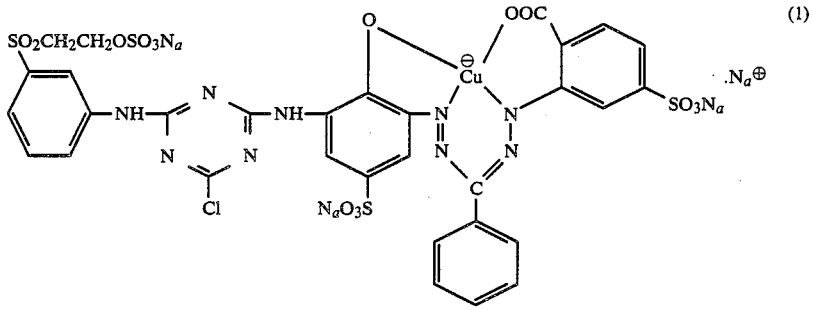

(1)

λ$_{max}$ = 610 nm (measured in a water medium)

EXAMPLES 2 TO 5

In a manner similar to that of Example 1, each dye was prepared using the reactants as shown in the following Table (1) to obtain dyes (2) to (5).

TABLE 1

| Example No. | Phenylhydrazine (VI) | Benzaldehyde (VII) | Amine (VIII) | Aniline compound (IV) | λ$_{max}$ (nm) (measured in a water medium) |
|---|---|---|---|---|---|
| 2 | 2-Carboxyphenyl-hydrazine-5-sulfonic acid | Benzaldehyde | 3-Acetylamino-2-hydroxyaniline-5-sulfonic acid | 1-Amino-2-methoxybenzene-5-β-sulfatoethylsulfone | 610 |
| 3 | 2-Carboxyphenyl-hydrazine-5-sulfonic acid | Benzaldehyde | 3-Acetylamino-2-hydroxyaniline-5-sulfonic acid | 1-Amino-2-methoxy-5-methyl-benzene-4-β-sulfatoethylsulfone | 610 |
| 4 | 2-Carboxyphenyl-hydrazine-5-sulfonic acid | Benzaldehyde | 3-Acetylamino-2-hydroxyaniline-5-sulfonic acid | 1-Amino-4-methoxybenzene-3-β-sulfatoethylsulfone | 610 |
| 5 | 2-Carboxyphenyl-hydrazine-4-sulfonic acid | Benzaldehyde | 5-Acetylamino-2-hydroxyaniline-3-sulfonic acid | 1-Aminobenzene-3-β-sulfatoethylsulfone | 610 |

EXAMPLE 6

Cyanuric chloride (16.6 parts) was added to water (100 parts) containing a nonionic surfactant (1 part) (produced by Kao-Atlas Chemical Co.) and was cooled to 0° to 5° C., then a neutralized solution of 1-aminobenzene-3-β-sulfatoethylsulfone (25.3 parts) was dropped to the solution in one hour and was stirred at 0° to 5° C. until the amino compound was no longer detected. A formazan complex of the formula:

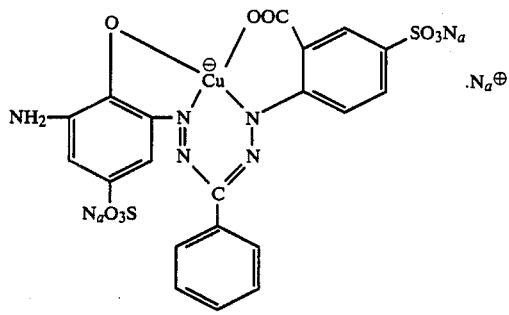

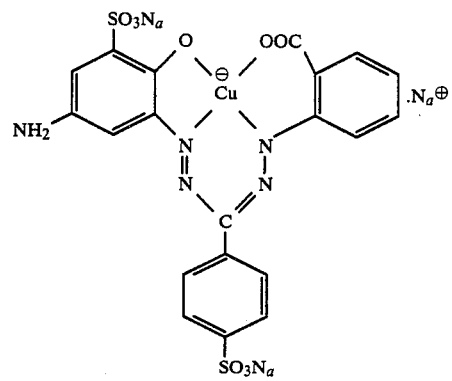

obtained in the same manner as Example 1, but by using 2-carboxyphenylhydrazine-4-sulfonic acid instead of 2-carboxyphenylhydrazine-5-sulfonic acid, was added to the above reaction solution which was then heated to 30° to 40° C. while being adjusted to a pH of 5 to 6 with a 20% aqueous sodium carbonate solution and stirred at the same temperature for 5 hours. Sodium chloride was added to the solution to salt out crystals. The crystals were suction-filtered, washed and dried at 60° C. to obtain 72 parts of the dye (6).

obtained in a manner similar to that of Example 1, was reacted with cyanuric chloride (16.6 parts) in water (200 parts) at 0° to 5° C. in the presence of sodium hydrogen carbonate until the formazan complex was no longer detected. The formazan liquor thus formed was adjusted to a pH of 5 to 6 with dilute sulfuric acid, and after adding crystalline 1-aminobenzene-3-β-hydroxyethylsulfone (18.1 parts), it was stirred at 40° to 45° C.

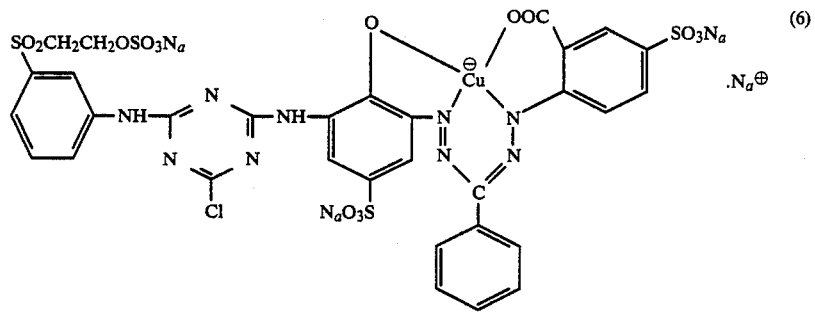

(6)

$\lambda_{max}$ = 610 nm (measured in a water medium)

EXAMPLES 7–10

In a manner similar to that of Example 6, each dye was prepared using the reactants as shown in the following Table (2) to obtain dyes (7) to (10).

for about 5 hours while being adjusted to a pH of 5 to 6 with a 2N-sodium hydroxide solution. Sodium chloride was added to the solution to salt out crystals. The crystals were suction-filtered, washed, dried at 80° C., powdered, and then added to 100% sulfuric acid (500 parts).

TABLE 2

| Example No. | Reactants Phenylhydrazine (VI) | Benzaldehyde (VII) | Amine (VIII) | Aniline compound (IV) | $\lambda_{max}$ (nm) (measured in a water medium) |
|---|---|---|---|---|---|
| 7 | 2-Carboxyphenyl-hydrazine-5-sulfonic acid | Benzaldehyde | 5-Acetylamino-2-hydroxyaniline-3-sulfonic acid | 1-Aminobenzene-4-β-sulfato-ethylsulfone | 610 |
| 8 | 2-Carboxyphenyl-hydrazine | Benzaldehyde | 5-Acetylamino-2-hydroxyaniline-3-sulfonic acid | 1-Amino-2-sulfo-benzene-4-β-sulfatoethyl-sulfone | 610 |
| 9 | 2-Carboxyphenyl-hydrazine | Benzaldehyde-2-sulfonic acid | 5-Acetylamino-2-hydroxyaniline-3-sulfonic acid | 1-Aminobenzene-3-β-sulfato-ethylsulfone | 585 |
| 10 | 2-Carboxyphenyl-hydrazine-4-sulfonic acid | Benzaldehyde-4-sulfonic acid | 3-Acetylamino-2-hydroxyaniline-5-sulfonic acid | 1-Amino-4-methoxybenzene-3-β-sulfato-ethylsulfone | 610 |

EXAMPLE 11

A formazan complex of the formula:

After esterification at 60° C. for 3 hours, the reaction mass was discharged to ice-water (2000 parts), then was neutralized to pH 5–5.5 by using soda ash, salted out, suction-filtered, washed and dried at 60° C. to obtain 80 parts of the dye (11).

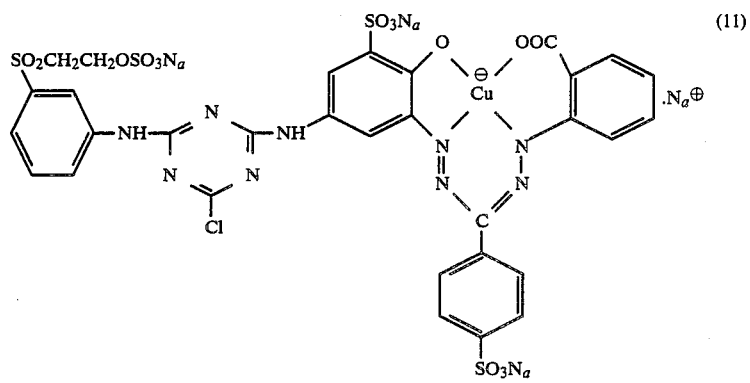

(11)

$\lambda_{max}$ = 605 nm (measured in a water medium)

EXAMPLE 12

0.3 Parts of a dye represented by the formula (1), obtained in Example 1, was dissolved in water (200 parts), and sodium sulfate (20 parts) and cotton (10 parts) were added to the dye liquor which was then heated to 40° C. After 30 minutes passed, sodium carbonate (4 parts) was added, and dyeing was carried out at the same temperature for 1 hour. After dyeing was finished, the dyed cotton was rinsed and soaped.

Thus, dyed products of a brilliant blue color having excellent fastnesses to chlorine, light and perspiration-light were obtained. The dyed products was well white discharged well with Redol C (discharging agent produced by Sumitomo Chemical Co.) to reveal a clear white portion.

EXAMPLE 13

0.3 Part of a dye represented by the formula (6), obtained in Example 6, was dissolved in water (200 parts), and sodium sulfate (20 parts) and cotton (10 parts) were added to the dye liquor which was then heated to 50° C. After 20 minutes passed, trisodium phosphate (3 parts) was added, and dyeing was carried out at the same temperature for 1 hour. After dyeing was finished, the dyed cotton was rinsed and soaped. Thus, dyed samples of a brilliant reddish blue color having excellent fastness to chlorine, light and perspiration-light were obtained. The dyed samples could be white discharged well with Redol C (produced by Sumitomo Chemical Co.), regenerating brilliant white parts.

EXAMPLE 14

Dyeing operation was carried out in the same manner as in Example 13 except that a dye of the formula (11) obtained in Example 11 was used in place of the dye of the formula (6),

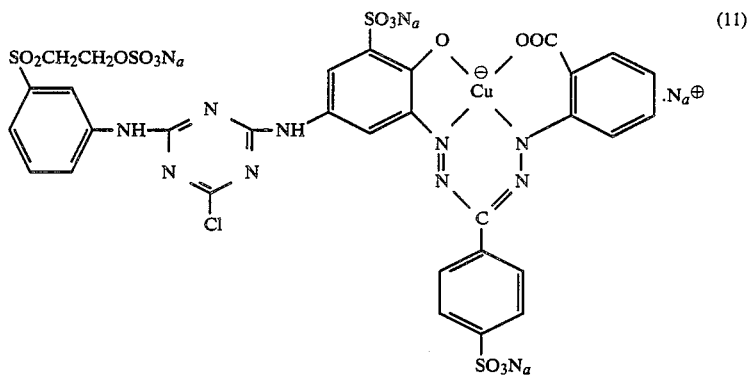

(11)

Thus, dyed products of a brilliant blue color having excellent fastness to chlorine, light and perspiration-

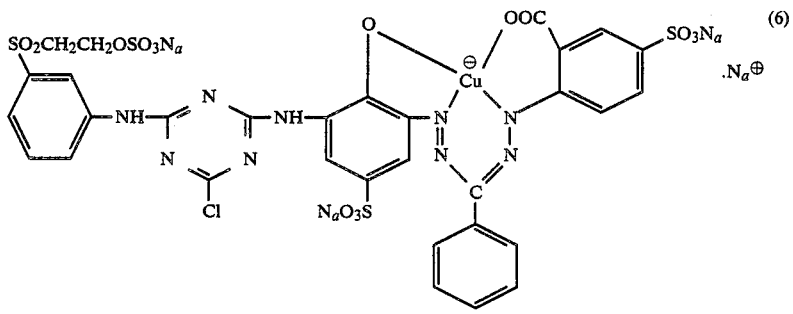

(6)

light were obtained. The dyed products could well be white discharged with Redol C (produced by Sumitomo Chemical Co.), regenerating brilliant white parts.

EXAMPLE 15

0.3 Part of a dye represented by the formula (10) obtained in Example 10,

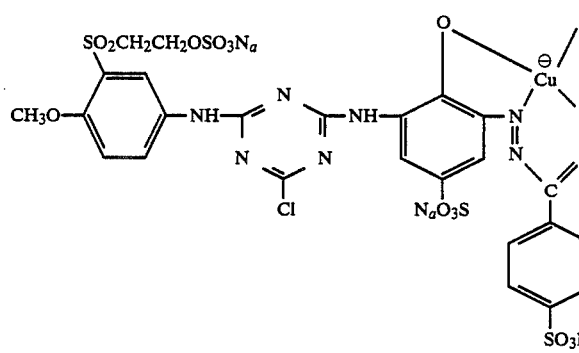

was dissolved in water (200 parts), and sodium sulfate (20 parts) and cotton (10 parts) were added to the dye liquor which was then heated to 50° C. After 20 minutes passed, sodium carbonate (4 parts) was added, and dyeing was carried out at the same temperature for 1 hour. After dyeing was finished, the dyed cotton was rinsed and soaped. Thus, dyed products of a brilliant blue color having excellent fastness to chlorine, light and perspiration-light were obtained. The dyed products could be white discharged well with Redol C (produced by Sumitomo Chemical Co.), regenerating brilliant white parts.

What is claimed is:

1. A compound represented by a free acid of the formula,

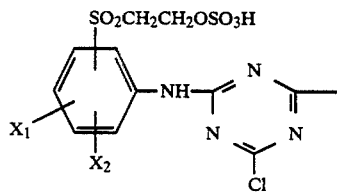

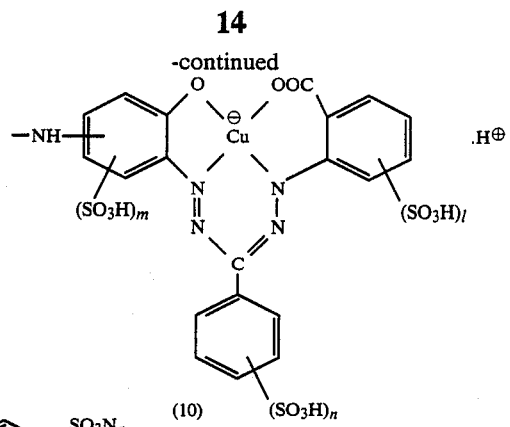

(10)

wherein $X_1$ and $X_2$ are each hydrogen, methyl or methoxy m and l are each an integer of 0 or 1 and n is an integer of 0 to 2, provided that the sum of m, n and l is 2 or 3.

2. A compound of the formula,

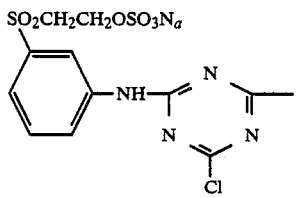

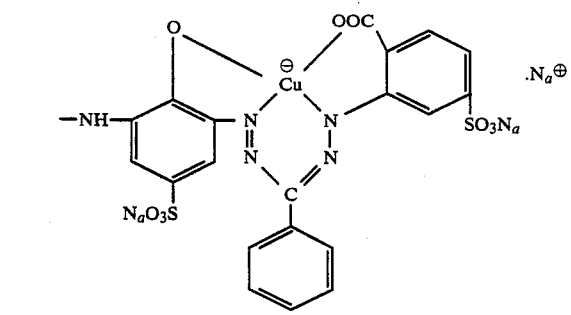

3. A compound of the formula,

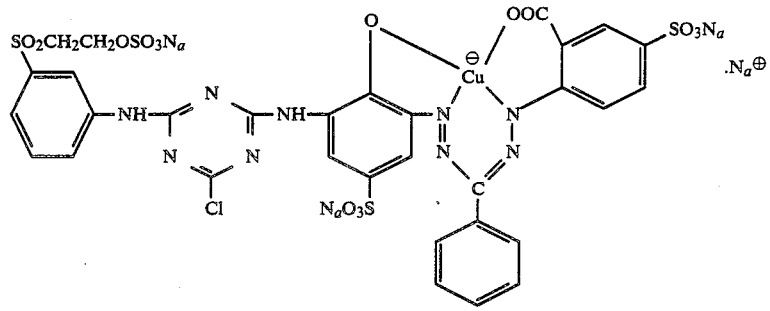
4. A compound of the formula,
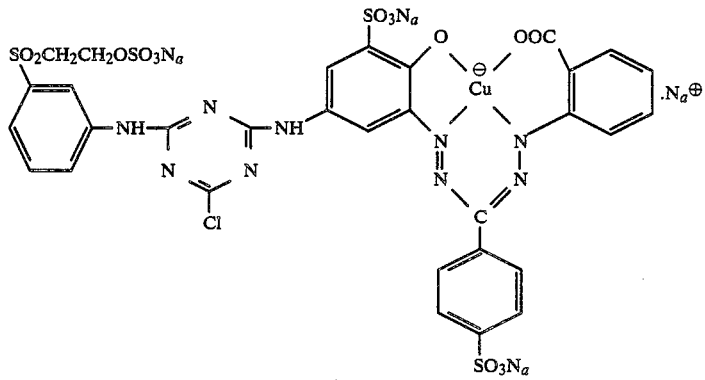
5. A compound of the formula,
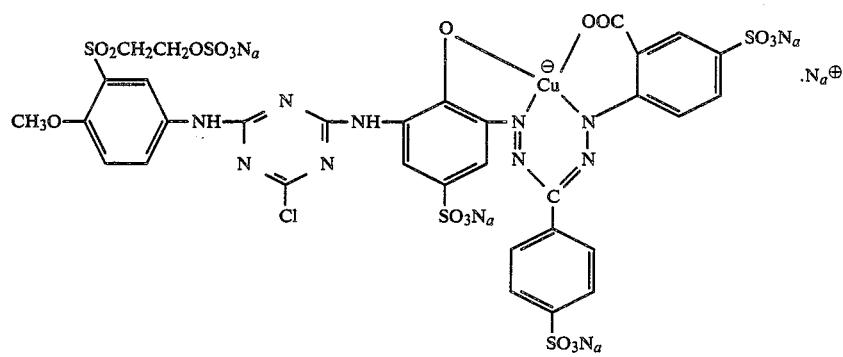
* * * * *